United States Patent
Lyu (10) Patent No.: US 10,317,788 B1
(45) Date of Patent: Jun. 11, 2019

(54) OUTDOOR AIR-PERMEABLE DOT SCREEN

(71) Applicant: Jae Ha Lyu, Daegu (KR)

(72) Inventor: Jae Ha Lyu, Daegu (KR)

(\*) Notice: Subject to any disclaimer, the term of this patent is extended or adjusted under 35 U.S.C. 154(b) by 0 days.

(21) Appl. No.: 15/570,338

(22) PCT Filed: Apr. 28, 2016

(86) PCT No.: PCT/KR2016/004437
§ 371 (c)(1),
(2) Date: Oct. 30, 2017

(87) PCT Pub. No.: WO2016/175569
PCT Pub. Date: Nov. 3, 2016

(30) Foreign Application Priority Data

Apr. 28, 2015 (KR) .................. 10-2015-0059473
Apr. 27, 2016 (KR) .................. 10-2016-0051460

(51) Int. Cl.
*G03B 21/60* (2014.01)
(52) U.S. Cl.
CPC .................. *G03B 21/60* (2013.01)
(58) Field of Classification Search
CPC ...................................... G03B 21/60
USPC ........................................ 359/443
See application file for complete search history.

(56) References Cited

U.S. PATENT DOCUMENTS

| | | | | |
|---|---|---|---|---|
| 2,107,707 A | * | 2/1938 | Newman | G03B 21/62 359/460 |
| 5,140,460 A | * | 8/1992 | Fukuhara | G03B 21/565 359/445 |
| 7,777,947 B2 | * | 8/2010 | Congard | G03B 21/56 359/445 |
| 9,625,802 B2 | * | 4/2017 | Warren-Hill | G03B 35/26 |
| 2006/0187544 A1 | * | 8/2006 | Wiener | G03B 21/58 359/443 |
| 2008/0043327 A1 | | 2/2008 | Allen et al. | |

FOREIGN PATENT DOCUMENTS

| | | |
|---|---|---|
| JP | 2004-045443 A | 2/2004 |
| KR | 20-2009-0010247 U | 10/2009 |
| KR | 10-0935451 B1 | 1/2010 |
| KR | 10-2009-0099173 A | 3/2014 |
| KR | 10-2014-0032199 A | 3/2014 |
| WO | WO-2017182829 A1 * 10/2017 ............ G03B 17/54 |

\* cited by examiner

*Primary Examiner* — Christopher E Mahoney
(74) *Attorney, Agent, or Firm* — Maschoff Brennan (57) ABSTRACT

The present invention relates to a holographic outdoor screen and, particularly, to an outdoor air-permeable dot screen comprising: entwined yarn which reduces wind resistance and enables a large image to be projected outdoors; a plurality of dots which are formed by knotting the entwined yarn at pre-set intervals so that light projected from an imaging device forms a diffused reflection; and through-holes which are formed between the dots in order to allow wind to permeate and light to scatter.

20 Claims, 7 Drawing Sheets

OUTDOOR AIR-PERMEABLE DOT SCREEN

TECHNICAL FIELD

The present invention relates to an outdoor air-permeable dot screen onto which a large image and a holographic image can be projected.

BACKGROUND ART

Generally, a method of forming an image on the outside air is to use a water film, smoke, translucent artificial silk, mesh fabric, or the like as a medium onto which an image is projected.

With the water film or smoke among the aforementioned materials, the image is variable and not static. Accordingly, the image is uncontrollable, and sharpness and sustainment of the image are degraded.

The translucent artificial silk and mesh fabric block the rear view due to translucency thereof and significantly reduce sharpness and color due to low diffuse reflectance. Further, when they have a wide area for outdoor use, they cannot withstand the force of the wind (wind pressure).

A holographic screen having a hard transparent film, which is a type of transparent film for receiving a projected image, is most widely used for indoor holographic image projection.

Figure 1:
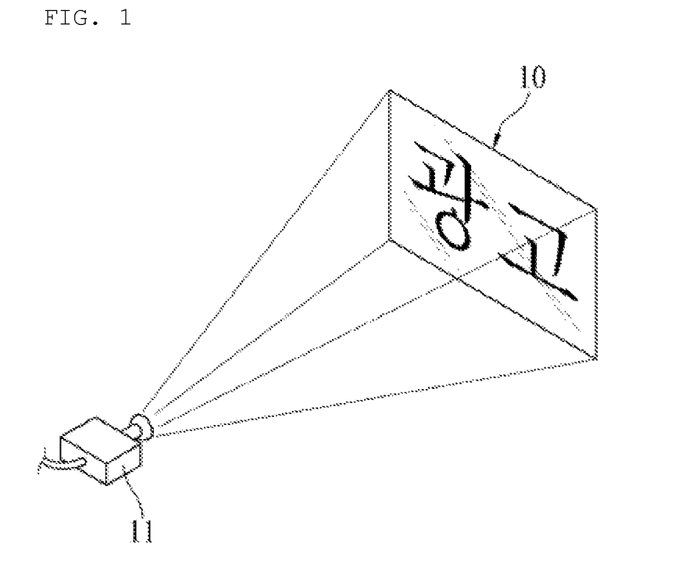
FIG. 1 schematically illustrates configuration of a conventional holographic screen installed outdoors.

FIG. 1 schematically illustrates configuration of a conventional holographic screen installed outdoors.

Referring to FIG. 1, the conventional holographic screen 10 is configured such that an image projected from an imaging device 11 is projected from behind a film-shaped transparent screen to display the image on the transparent screen.

Since the conventional holographic screen 10 causes an image to be projected onto a transparent film type screen, it secures transparency. However, since the conventional holographic screen 10 employs a method of forming an image by forming a thin film, it is used indoors or attached to a transparent plate in most cases. Therefore, when a large screen needs to be installed in an outdoor space, the conventional holographic screen cannot be used in reality due to the following problems.

First, since the conventional holographic screen 10 cannot withstand the wind, the screen alone cannot be installed outside.

Second, since the conventional holographic screen 10 reflects only a part of light due to transparency thereof, image quality is deteriorated, and sharpness and brightness are remarkably lower than those of a typical reflective screen.

Third, since the conventional holographic screen 10 is formed of a transparent hard film, it cannot be bent to have a desired shape.

The smooth surface of the holographic screen does not have a stereoscopic texture that causes diffuse reflection. To cause diffuse reflection to increase sharpness, foreign substances such as glass grains are attached to or inserted into the plate, or a net-shaped grid is printed on the plate or transparent yarn is attached to the plate.

Since these methods produce a plate-shaped structure and thus require high manufacturing costs, and the structure is heavy. Further, compared to a typical film-type holographic screen, the plate-shaped structure has reduced loss of sharpness, but requires higher production costs than the film type holographic screen.

In addition, in the case of the plate-shaped structure, diffuse reflection is insufficient and light scattering is weak because there is no air layer in the structure. Therefore, with the plate-shaped structure, sharpness is remarkably deteriorated compared to the image quality on a typical opaque reflective screen. Further, the plate-shaped structure is unsuitable for a large screen, and is restricted in size as it cannot withstand wind pressure when installed outdoors.

An opaque film reflective screen, which is popularized but is not a holographic screen, is also intended for indoor use and cannot withstand wind pressure, and thus it cannot be used outdoors when the size thereof is increased.

For these reasons, in order to realize a large screen for image projection in an outdoor space, the screen is basically required to withstand wind pressure and to have a large structure to support the screen while maintaining sharpness.

As imaging technology develops, activities such as outdoor advertisement and stage performances increasingly need large screens. Currently, however, most of the screens are not used for outdoor activities due to several problems including the above problems. Instead, a majority of large-scale images in outdoor spaces depend on LED display boards, which are costly due to heavy weight and installation complexity. Further, the structure blocks the rear view and thus deteriorates aesthetics of the city. In addition, it cannot be used for a holographic screen or the like.

DISCLOSURE

Technical Problem

Therefore, the present invention has been made in view of the above problems, and it is one object of the present invention to provide an outdoor air-permeable dot screen that prevents presence of the screen from being recognized by avoiding blocking the view behind the screen during outdoor image projection and enables realization of a large holographic screen in an outdoor space by minimizing wind resistance.

It is another object of the present invention to provide an outdoor air-permeable dot screen which can provide sharpness close to that on a reflective screen and be manufactured in various stereoscopic shapes while reducing manufacturing costs through lightweight design.

Technical Solution

In order to solve the above-mentioned problems, the present invention may include the following configuration.

In accordance with one aspect of the present invention, provided is an outdoor air-permeable dot screen allowing an image projected from an imaging device to be formed thereon, the screen including an entwined yarn formed by entwining transparent film yarns, a plurality of dots formed by knotting the entwined yarn at preset intervals to cause diffuse reflection of light projected from the imaging device, and a through hole formed between the dots in a penetrating manner for air permeation and scattering of light.

In the outdoor air-permeable dot screen, the entwined yarn may be formed of thread formed by entwining a single transparent film yarn or a plurality of transparent film yarns.

In the outdoor air-permeable dot screen, the entwined yarn may be formed in a multilayer structure or a concavo-convex structure to form an air-permeable fine space for diffuse reflection.

In the outdoor air-permeable dot screen, the entwined yarn may be formed by one of entwining, twisting, knotting and extrusion molding.

In the outdoor air-permeable dot screen, the entwined yarn may be formed of transparent film yarns containing a light reflecting material.

In the outdoor air-permeable dot screen, a fragmented film yarn may be attached to the entwined yarn.

In the outdoor air-permeable dot screen, a fine line may be attached to the entwined yarn, wherein the fine line may be formed to be thinner than the entwined yarn.

In the outdoor air-permeable dot screen, spangles may be attached to at least one of the entwined yarn and the dots.

In the outdoor air-permeable dot screen, the dots may be formed to have an annular volume by knotting the entwined yarn, or may be formed to have a volume by intersecting knots with respect to the entwined yarn.

In accordance with another aspect of the present invention, provided is an outdoor air-permeable dot screen allowing an image projected from an imaging device to be formed thereon, the screen including an entwined yarn formed by entwining one of a polyester yarn, an acrylic yarn, a nylon yarn, a rayon yarn and a metal yarn, a plurality of dots formed by knotting the entwined yarn at preset intervals to cause diffuse reflection of light projected from the imaging device, and a through hole formed between the dots in a penetrating manner for air permeation and scattering of light.

In the outdoor air-permeable dot screen of the present invention, the through hole may include a plurality of through holes such that the entwined yarn and the dots form a hole net structure.

Advantageous Effects

The outdoor air-permeable dot screen according to the present invention has the following effects.

First, according to the present invention, the screen is formed in a structure including through holes, which are invisible at a distance longer than a certain distance, and thus may have the same screen effect irrespective of forward projection and rearward projection, and avoid blocking of a rear view, thereby enabling a holographic image to be displayed in an outdoor free space.

Second, the present invention may improve the contrast and sharpness of a projected image by securing through holes having dimensions that enable light to be collected in the through holes through the scattering effect of fine dust in the air and the diffraction effect of light and using the air space layer in the through holes as a medium.

Third, the present invention may minimize the influence of the wind and implement a large holographic screen in an outdoor space by securing through holes, which form an air layer in the screen through which the wind passes.

Fourth, as the present invention uses annular stereoscopic dots, it may increase the perceived sharpness of screen images by enhancing diffuse reflection of light and inducing the optical illusion effect.

Fifth, as the present invention simplifies the structure of the screen, the screen may become lighter and manufacturing costs may be reduced.

Sixth, the present invention may implement a holographic screen in various stereoscopic shapes in an outdoor space due to the light weight and flexibility of the screen.

BEST MODE

It is to be understood that the terms or words used in the specification and claims should not be limited to ordinary meanings or dictionary definitions, but should be construed in accordance with the meanings and concepts consistent with the technical idea of the present invention based on the fact that the inventor may properly define the meanings of the terms in order to best describe the invention.

Hereinafter, preferred embodiments of the present invention will be described in detail with reference to the accompanying drawings.

Figure 2:
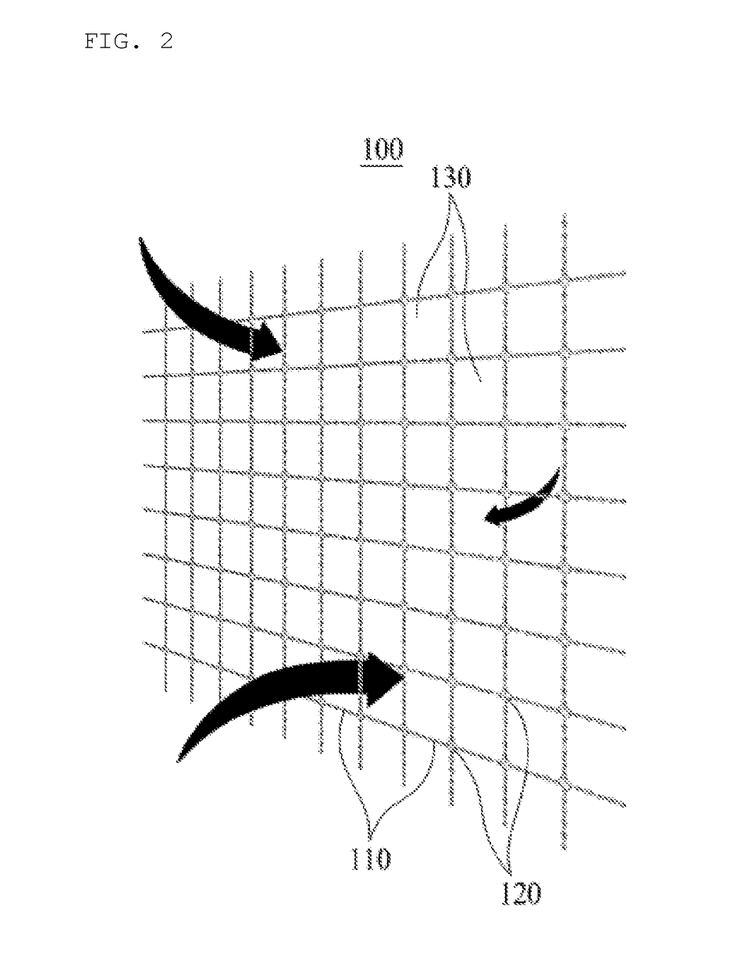
FIG. 2 is a view showing an outdoor air-permeable dot screen according to the present invention.
Figure 3:
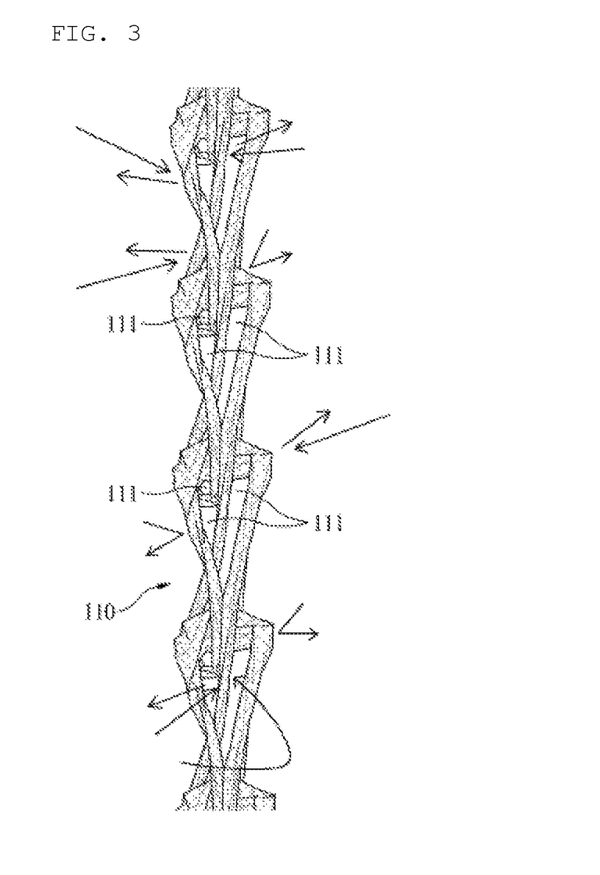
FIG. 3 is a partially enlarged view of entwined yarn of the outdoor air-permeable dot screen according to the present invention.
Figure 4:
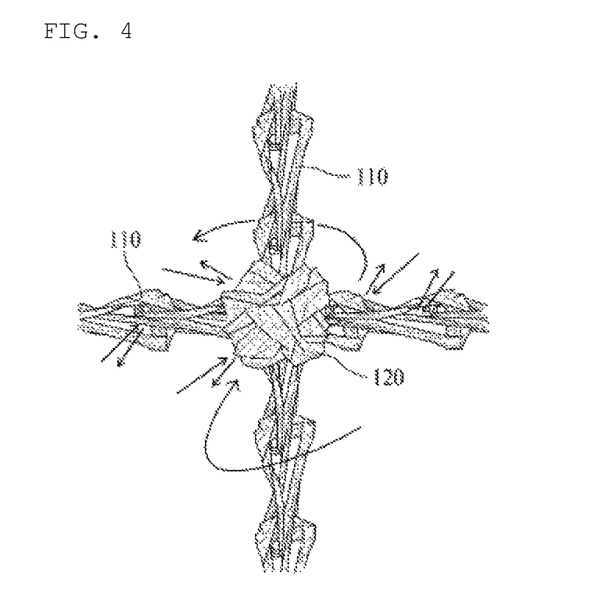
FIG. 4 is a partially enlarged view of the outdoor air-permeable dot screen according to the present invention.
Figure 5:
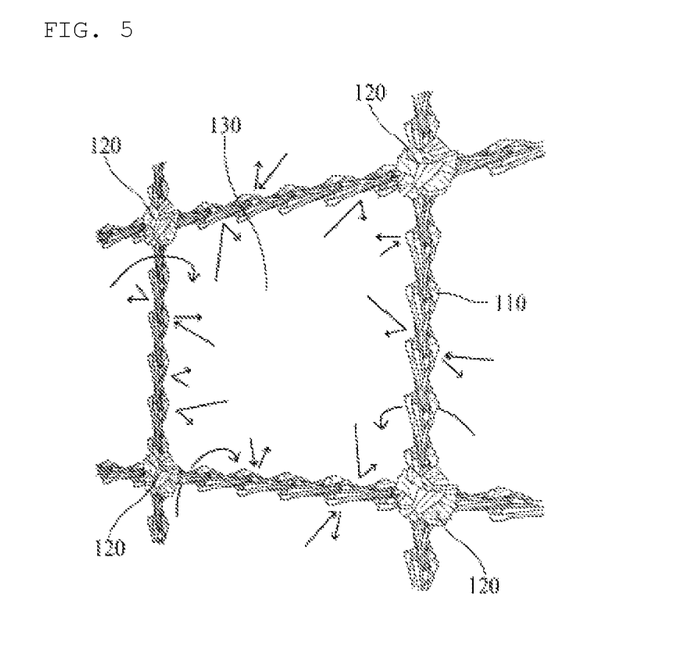
FIG. 5 illustrates formation of an image by diffuse reflection and diffraction of scattered light on the outdoor air-permeable dot screen according to the present invention.
Figure 6:
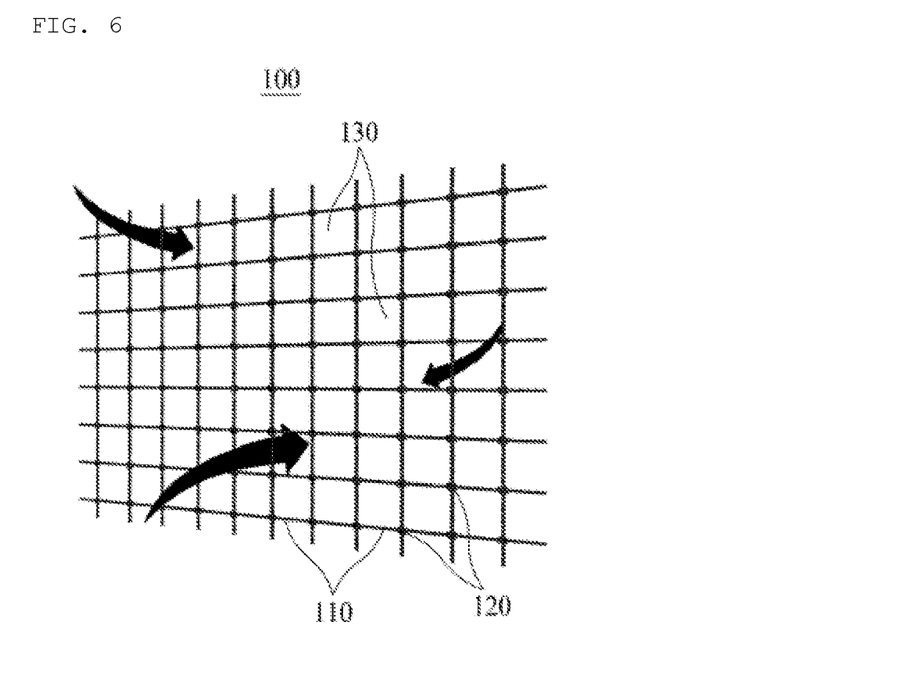
FIG. 6 is a view showing an outdoor air-permeable dot screen according to a modified embodiment of the present invention.
Figure 7:
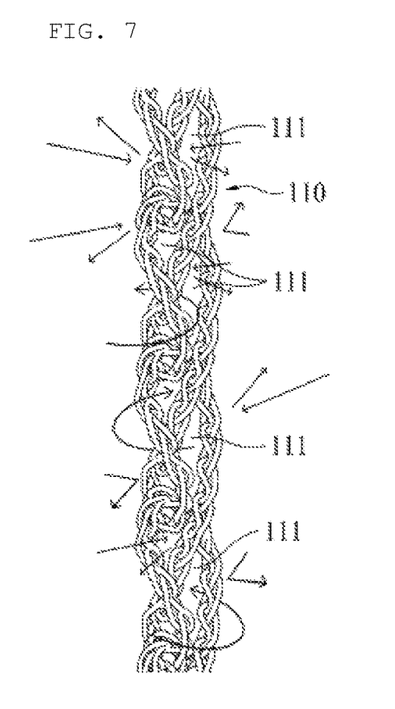
FIG. 7 is a partially enlarged view of entwined yarn of the outdoor air-permeable dot screen according to the modified embodiment of the present invention.
Figure 8:
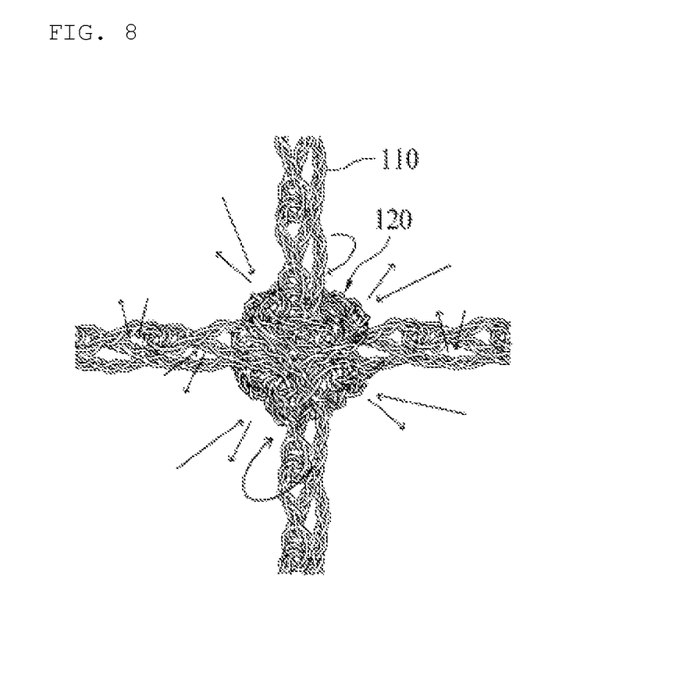
FIG. 8 is a partially enlarged view of the outdoor air-permeable dot screen according to the modified embodiment of the present invention.
Figure 9:
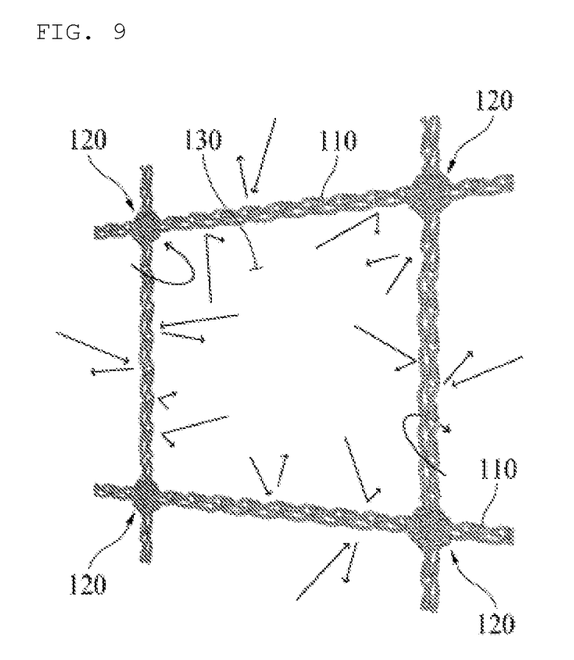
FIG. 9 illustrates formation of an image by diffuse reflection and diffraction of scattered light on the outdoor air-permeable dot screen according to the modified embodiment of the present invention.

FIG. 2 is a view showing an outdoor air-permeable dot screen according to the present invention, and FIG. 3 is a partially enlarged view of entwined yarn of the outdoor air-permeable dot screen according to the present invention. FIG. 4 is a partially enlarged view of the outdoor air-permeable dot screen according to the present invention, and FIG. 5 illustrates formation of an image by diffuse reflection and diffraction of scattered light on the outdoor air-permeable dot screen according to the present invention.

The present invention is directed to an outdoor air-permeable dot screen of the present invention capable of being formed to have various shapes and a large size while exhibiting a holographic effect by generating an optical illusion as if an image projected from an imaging device is formed in an outdoor free space, which will be described in detail with reference to the drawings.

Referring to FIG. 2, the outdoor air-permeable dot screen 100 according to the present invention may include an entwined yarn 110 formed by entwining transparent film yarns, a dot 120 formed by knotting the entwined yarn 110 at preset intervals, and a through hole 130 formed between the dots 120 for penetrating and scattering of air.

The entwined yarn 110 may be embodied to include a fine hole net 111. The dot 120 is provided to cause diffuse reflection of light projected from the imaging device. The dot 120 may be formed to have a volume capable of causing diffuse reflection upon receiving light.

The through hole 130 may be formed to have a spatial dimension of about 2.5 $cm^2$ which may lead to diffuse reflection, scattering, and diffraction of light, and have a face to receive light. In addition, the outdoor air-permeable dot screen 100 may have low wind resistance by forming a vacant space in the mesh network by the through hole 130. As the outdoor air-permeable dot screen 100 includes the entwined yarn 110, the dot 120, and the transmission hole 130, the perceived sharpness of an image by visual illusion may be enhanced when the image is perceived.

Referring to FIG. 3, the entwined yarn 110 may be formed by entwining a single yarn or a plurality of film yarns. A part formed to have a certain volume by knotting the entwined yarn 110 may be a stereoscopic annular dot 120.

Preferably, the entwined yarn 110 is formed through one of entwining, twisting, knotting and extrusion molding.

The diameter of the entwined yarn 110 may be about 1.6 mm.

The entwined yarn 110 may be formed into a multilayer structure or a concavo-convex structure in an entwined or twisted manner in which a space is formed to have various angles so as to allow air to pass therethrough for diffuse reflection.

The entwined yarn 110 may be implemented so as to secure the fine hole net 111 for reflection and scattering of light when manufactured.

Thus, the entwined yarn 110 is twisted or woven to be positioned at various angles in all directions therearound so as to secure opacity of white color while losing transparency.

The opacity of the white color makes it possible to construct the entwined yarn 110 that expands diffuse reflection of light and secures a fine hole net by repetitive overlapping or a scattering space of a multilayer structure by unevenness.

Using this method, it is possible to configure the entwined yarn 110 such that an air-permeable area and a non-permeable area which are not visible to the human eye at a certain distance (8 m or more) but allow diffuse reflection of light are alternately repeated.

FIG. 4 is a partially enlarged view of the outdoor air-permeable dot screen according to the present invention. Referring to FIG. 4, when a knot is formed by the entwined yarn 110, the entwined yarn is knotted in a plurality of layers, and the angles of the entwined yarn 110 form a stereoscopic dot 120 which can amplify diffuse reflection by irregular overlapping or bending and induce diffraction of light as a medium.

The knot-shaped dot 120 serves to sufficiently secure the role of the medium, and the stereoscopic nature of the dot 120 serves to increase the diffraction rate of light by amplifying diffuse reflection at various angles.

In addition, the dot 120 may increase readability of an image formed by light through the illusion caused by the contour of illusion due to dot-to-dot connection together with the entwined yarn 110.

For example, at a distance of 8 m or more during day and night, the knot dimension of the stereoscopic dot 120 formed by tying the entwined yarn 110 is preferably about 3.5 mm such that the annular stereoscopic dot 120 cannot be visually recognized.

FIG. 5 is an enlarged view of a penetrating hole illustrating formation of an image by diffuse reflection and diffraction of scattered light on the outdoor air-permeable dot screen according to the present invention. Referring to the figure, the through hole 130 causes the entwined yarn 110 to maintain the interval and shape of the gap between one stereoscopic dot 120 and another stereoscopic dot 120, and forms a space having dimensions enabling diffraction of light in addition to the scattering effect, thereby amplifying light.

In addition to the fine hole net 111, which forms a medium, the entwined yarn 110 and the dot 120, the through hole 130 increases the recognition rate of a shape image by adding optical illusion caused by the afterimage effect, which is a visual perception effect, and apparent movement in receiving light when an image is projected from the imaging device.

At this time, if a space of about 25 mm is formed between the stereoscopic dots 120 and 120, the screen may not be recognized by human eyes.

While the image is formed by light, the screen is not affected by the wind due to the space of the through hole 130 formed between the dot 120 and the dot 120 as shown in FIG. 5.

In addition, as the space of the through hole 130 is narrowed, the thickness of the entwined yarn 110 may be reduced.

For example, the areas of the entwined yarn 110 and the stereoscopic dot 120 may be determined in proportion of 10% to 20% of the area of one square in the hole net structure. Here, the proportion with the highest efficiency is about 15%.

Meanwhile, the entwined yarn 110 may be manufactured by plaiting transparent film yarns, which are small fragmented yarns. Thereby, the projection effect may be maximized.

In addition, in plaiting yarns to form the entwined yarn 110, additional fine yarns may be added or attached to maximize the projection effect.

In constructing the entwined yarn 110, the fine hole net 111 or a concavo-convex structure may be formed.

In addition, the entwined yarn 110 may contain a light reflecting material.

In addition, fine lines thinner than the entwined yarn 110 may be added or attached to the entwined yarn 110.

Spangles may be attached to at least one of the entwined yarn 110 and the dot 120. Not only an annular knot but also an intersection point may be formed on the entwined yarn 110 and the dot 120.

Here, in constructing the light receiving surface when constructing the screen through the entwined yarn 110 and the dot 120, the surface on which the image is projected is preferably composed of a multifaceted surface and a curved surface in order to realize a stereoscopic image. In addition, the squares of the surface receiving projected light may be configured in various shapes and forms. The entwined yarn 110 may be provided with an air-permeable hole net structure to minimize wind resistance and visibility.

The outdoor air-permeable dot screen 100 may be configured to be super-lightweight compared to a typical fabric screen or a holographic screen (transparent screen) and to be stereoscopic such that the screen is invisible. Thereby, a stereoscopic image may be realized through beam projection at each angle.

Hereinafter, operation of the above-described outdoor air-permeable dot screen will be described with reference to FIG. 5.

The outdoor air-permeable dot screen 100 uses the fine hole net 111, the entwined yarn 110, the stereoscopic dot 120, and the through hole 130 as optical media.

The projected light is diffusely reflected in the fine hole net 111, the entwined yarn 110, and the stereoscopic dot 120, which are oriented at multiple angles. The light scattered by fine dust in the air and the diffusely reflected light are diffracted and collected into the through holes 130, which are divided from each other.

As these light effects are combined with optical illusion of the eyes, the image is recognized. Furthermore, as the contrast difference between the hole net receiving light and the hole net not receiving light is increased, a higher-definition image is obtained.

As described above, in the outdoor air-permeable dot screen 100 according to the present invention, the entwined yarns 110 including the fine hole net 111 are arranged at regular intervals in a hole net structure such that an image projected from an imaging device is formed on the fine hole net 111, the entwined yarns 110, the dots 120 and the through holes 130. Thereby, sharpness of the projected image may be enhanced, and the same screen effect may be achieved regardless of forward or backward projection.

Accordingly, the outdoor air-permeable dot screen 100 according to the present invention may minimize influence of the wind and avoid blocking the field of view on the back of the screen by securing a large number of empty spaces in the screen. It may also serve as a clear holographic screen in an outdoor space and realize a large screen in various shapes.

While the outdoor air-permeable dot screen 100 is illustrated in FIGS. 2 to 5 as being embodied using the entwined yarn 110 formed by entwining transparent film yarns, the outdoor air-permeable dot screen 100 according to a modified embodiment of the present invention may be realized using an entwined yarn 110 formed of another material in addition to the transparent film yarn as shown in FIGS. 6 to 9. For example, the outdoor air-permeable dot screen 100 according to the modified embodiment may be implemented using an entwined yarn 110 formed by entwining one of polyester, acrylic, nylon, and rayon series yarns and metal yarns.

While the present invention has been described with reference to exemplary embodiments, it is to be understood that the invention is not limited to the disclosed exemplary embodiments, but, on the contrary, is intended to cover various modifications and equivalent arrangements within the spirit and scope of the invention.

The invention claimed is:

1. An outdoor air-permeable dot screen allowing an image projected from an imaging device to be formed thereon, the screen comprising:
   an entwined yarn formed by entwining transparent film yarns;
   a plurality of dots formed by knotting the entwined yarn at preset intervals to cause diffuse reflection of light projected from the imaging device; and
   a through hole formed between the dots in a penetrating manner for air permeation and scattering of light.

2. The outdoor air-permeable dot screen according to claim 1, wherein the entwined yarn is formed of thread formed by entwining a single transparent film yarn or a plurality of transparent film yarns.

3. The outdoor air-permeable dot screen according to claim 2, wherein the through hole comprises a plurality of through holes such that the entwined yarn and the dots form a hole net structure.

4. The outdoor air-permeable dot screen according to claim 1, wherein the entwined yarn is formed in a multilayer structure or a concavo-convex structure to form an air-permeable fine space for diffuse reflection.

5. The outdoor air-permeable dot screen according to claim 4, wherein the through hole comprises a plurality of through holes such that the entwined yarn and the dots form a hole net structure.

6. The outdoor air-permeable dot screen according to claim 1, wherein the entwined yarn is formed by any one of entwining, twisting, knotting and extrusion molding.

7. The outdoor air-permeable dot screen according to claim 6, wherein the through hole comprises a plurality of through holes such that the entwined yarn and the dots form a hole net structure.

8. The outdoor air-permeable dot screen according to claim 1, wherein the entwined yarn is formed of transparent film yarns containing a light reflecting material.

9. The outdoor air-permeable dot screen according to claim 8, wherein the through hole comprises a plurality of through holes such that the entwined yarn and the dots form a hole net structure.

10. The outdoor air-permeable dot screen according to claim 1, wherein a fragmented film yarn is attached to the entwined yarn.

11. The outdoor air-permeable dot screen according to claim 10, wherein the through hole comprises a plurality of through holes such that the entwined yarn and the dots form a hole net structure.

12. The outdoor air-permeable dot screen according to claim 1, wherein:
   a fine line is attached to the entwined yarn; and
   the fine line is formed to be thinner than the entwined yarn.

13. The outdoor air-permeable dot screen according to claim 12, wherein the through hole comprises a plurality of through holes such that the entwined yarn and the dots form a hole net structure.

14. The outdoor air-permeable dot screen according to claim 1, wherein spangles are attached to at least one of the entwined yarn and the dots.

15. The outdoor air-permeable dot screen according to claim 14, wherein the through hole comprises a plurality of through holes such that the entwined yarn and the dots form a hole net structure.

16. The outdoor air-permeable dot screen according to claim 1, wherein the dots are formed to have an annular volume by knotting the entwined yarn, or are formed to have a volume by intersecting knots with respect to the entwined yarn.

17. The outdoor air-permeable dot screen according to claim 16, wherein the through hole comprises a plurality of through holes such that the entwined yarn and the dots form a hole net structure.

18. The outdoor air-permeable dot screen according to claim 1, wherein the through hole comprises a plurality of through holes such that the entwined yarn and the dots form a hole net structure.

19. An outdoor air-permeable dot screen allowing an image projected from an imaging device to be formed thereon, the screen comprising:
   an entwined yarn formed by entwining any one of a polyester yarn, an acrylic yarn, a nylon yarn, a rayon yarn and a metal yarn;
   a plurality of dots formed by knotting the entwined yarn at preset intervals to cause diffuse reflection of light projected from the imaging device; and
   a through hole formed between the dots in a penetrating manner for air permeation and scattering of light.

20. The outdoor air-permeable dot screen according to claim 19, wherein the through hole comprises a plurality of through holes such that the entwined yarn and the dots form a hole net structure.

* * * * *